Figure 1:
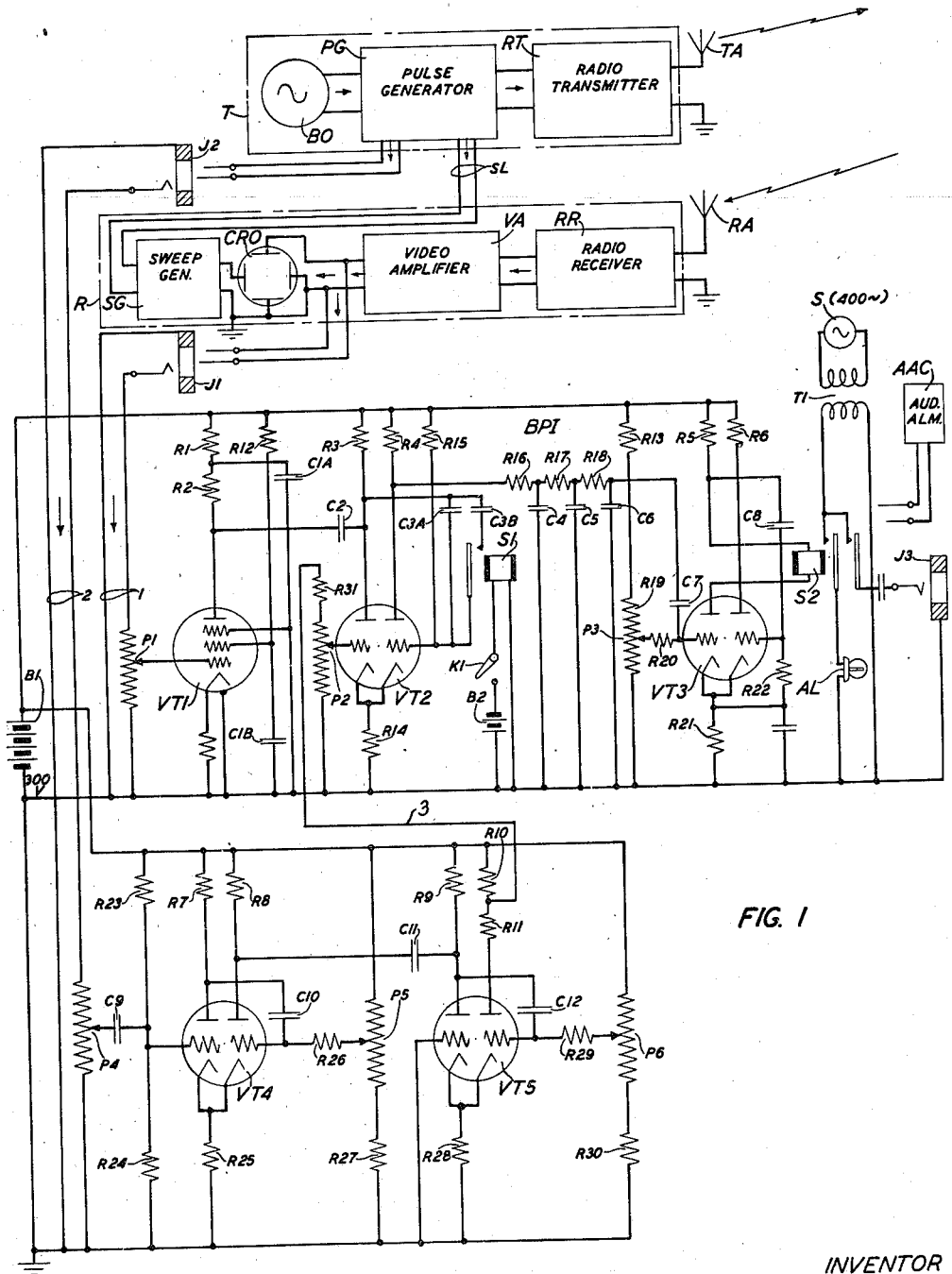

INVENTOR
R. O. WISE
BY
Earl C. Laughlin
ATTORNEY

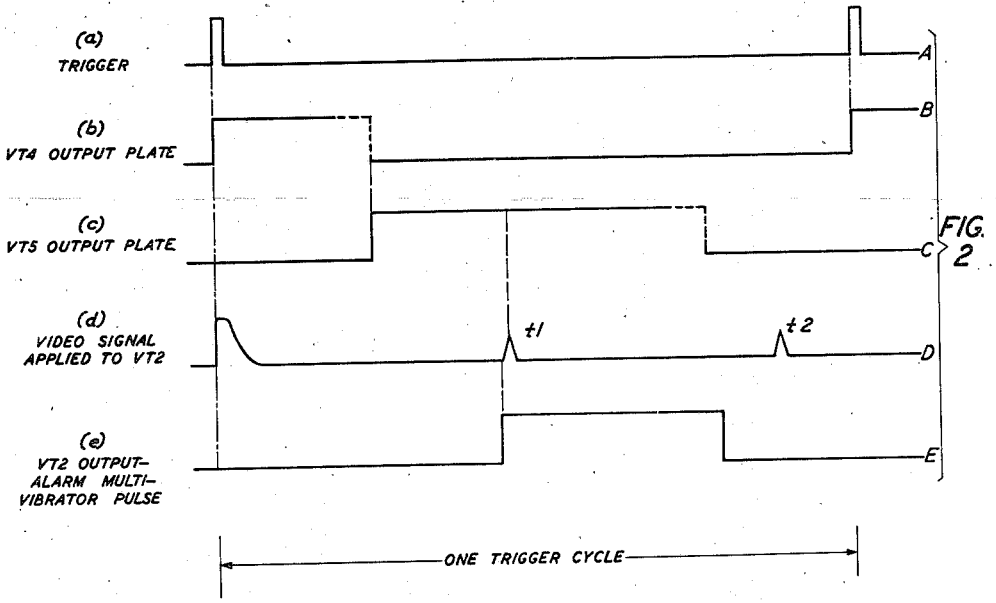
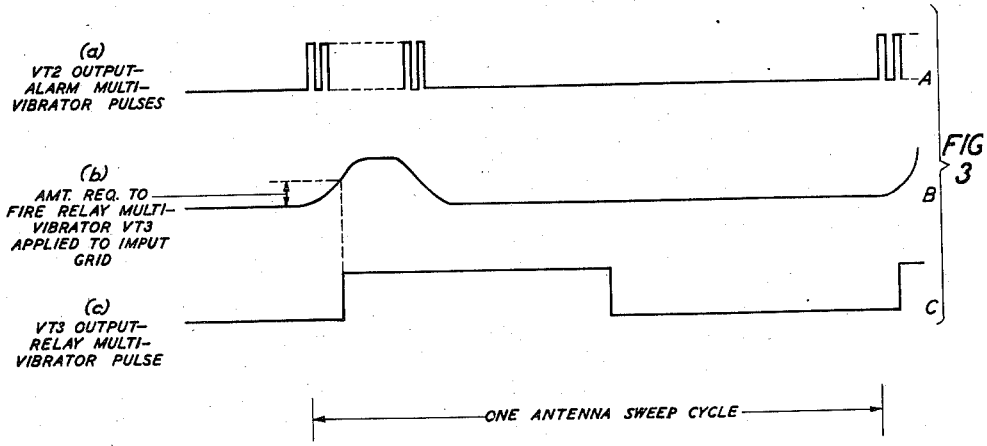

Patented Sept. 30, 1947

2,428,058

UNITED STATES PATENT OFFICE 2,428,058

OBJECT LOCATING AND DISTANCE MEASURING SYSTEMS OF THE PULSE REFLECTION TYPE

Raymond O. Wise, Short Hills, N. J., assignor to Bell Telephone Laboratories, Incorporated, New York, N. Y., a corporation of New York Application October 27, 1943, Serial No. 507,804

4 Claims. (Cl. 250—1.66)

This invention relates to object locating and distance measuring systems of the pulse reflection type and particularly to an automatic echo alarm circuit for use with such systems.

The invention is particularly applicable to and will be described in connection with a pulse reflection type system employing radio waves, commonly called a radar system, but is applicable as well to such systems employing other types of waves, for example, sound ranging systems employing compressional sound waves.

A radar system usually includes a transmitting device adapted to radiate radio frequency pulses of very short duration at frequent intervals; a receiving device at the same location for picking up and detecting return pulses, which may be termed radio echoes, reflected from objects (targets) on which the radiated signal pulses impinge; and a suitable indicator, such as a cathode ray oscilloscope having its sweep synchronized with the period of the radiated pulses for causing indications representing the detected echoes in the order of their receipt to be displayed along a time axis on a screen so as to provide a measure of the time interval elapsing between the emission of each radiated pulse and the receipt of a corresponding echo at the observation point. The elapsed time interval is proportional to the distance to the object causing the echo, and may be translated into distance units.

When such radar equipment is in use, it frequently happens that no echo is received in the searching range for a long period of time. Thus, in order not to miss an echo when one is received, the radar operator must maintain his attention focussed substantially continuously on the indicator screen.

For overcoming this disadvantage, the copending patent application of A. M. Skellett, Serial No. 507,805, filed October 27, 1943, discloses an automatic arrangement for providing a visual or audible alarm, or both, whenever an indication of an echo from an object within a given distance range appears on the indicator screen. This arrangement comprises an "alarm" multivibrator which is triggered off by all wave energy in the output of the video amplifier in the radar receiver, having an amplitude above a given threshold value, whether due to signal echoes or noise peaks; an amplifier driven by the multivibrator so as to produce an average output current proportional to the frequency of operation of the multivibrator; a relay circuit in the output of the amplifier, of such constants as to be operated to activate alarm devices by the amplifier output current produced in response to multivibrator operation at the signal frequency by a group of received echoes, but to be unresponsive to the amplifier output current produced by multivibrator operation at a lower frequency caused by the relatively random noise peaks; and a "blanking" multivibrator controlled from the pulse transmitter for controlling the sensitivity of the alarm multivibrator so as to prevent its operation by the remnant of each directly received transmitted pulse which gets through the radar receiver and by other unwanted signals.

An object of the invention is to improve automatic echo alarm arrangements of the above-described type particularly from the standpoint of providing better discrimination between noise and echoes and more positive operation of the alarms.

A more specific object is to provide automatically a visual or an audible signal, or both, to attract the attention of the operator of a pulse reflection type object locating and distance measuring system only when an indication of an echo from an object within a given distance range from the observation point appears on the indicator screen.

These objects are attained in accordance with the present invention mainly by providing in combination with an automatic echo alarm arrangement of the general type disclosed above, a band-pass filter integrator for producing a more critical discrimination between noise and echo group operations of the alarm multivibrator over the scanning range of the radar receiver; another multivibrator, instead of an amplifier, operating as a sharp amplitude discriminator of the band-pass filter integrator output and to produce more positive operation of the alarm devices; and an improved "blanking" multivibrator arrangement for preventing operation of the alarms by the directly received transmitted pulses and by echoes from "near-in" objects and distant known objects.

The various objects and features of the invention will be better understood from the following detailed description when read in conjunction with the accompanying drawings in which:

Fig. 1 shows schematically an echo alarm arrangement in accordance with the invention applied to a radar system; and Figs. 2 and 3 show curves used for explaining the operation of the arrangement of the invention shown in Fig. 1.

The radar system of Fig. 1, shown in block diagrammatic form, to which the circuits of the invention are applied, consists of a transmitter T supplying short pulses of ultra-high or radio frequency to the transmitting antenna TA for radiation therefrom, and a receiver R at the same location for receiving from the receiving antenna RA the return pulses (radio echoes) reflected from distant objects (targets) to be located, on which the radiated pulses impinge. The period of the radiated pulses is so chosen as to be equal to the total time required for a wave to pass from the transmitter T to an object at the limit of the range over which the system can operate, and the reflected wave to return from that object to the receiver R, and the durations of the transmitted pulses are usually made very short compared with that period.

The transmitting antenna TA or the receiving antenna RA, or both, are of the highly directive type. Instead of separate antennas as illustrated, a common antenna may be provided for transmitting and receiving the pulses, in which case an automatic transmit-receive switch of any of the known types would be employed to effectively block the transmitted pulses from the receiver during pulse transmitting intervals.

The radiated pulses may be produced, as indicated diagrammatically, by keying the radio transmitter RT from the output of a suitable pulse generator PG energized from the base frequency oscillator BO of suitable frequency. The receiver R for the return pulses or radio echoes, as indicated, may include a radio receiver RR, which may be of the double detection superheterodyne type, fed from the receiving antenna RA, followed by a video amplifier VA and the cathode ray oscilloscope CRO. The sweep deflection plates of the oscilloscope RCO are supplied with a saw-tooth timing wave from the sweep generator SG the sweep of which is synchronized with the period of the transmitted pulses by a synchronizing voltage received over the leads SL from the transmitting pulse generator PG in well-known manner.

The circuits of the invention as shown in Fig. 1 include as main elements the limiting amplifier VT1, the "alarm" multivibrator VT2, the band-pass filter integrator BPI, the "relay" multivibrator VT3, the alarm relay S2, the alarm lamp AL, the audible alarm circuit AAC, and the "blanking" multivibrators VT4 and VT5.

The multivibrators VT2, VT3, VT4 and VT5 are of the well-known "start-stop" type each comprising two electron discharge amplifying devices retroactively coupled in an unsymmetrical arrangement. As shown, the two electron discharge devices in each multivibrator may comprise two amplifying triodes in a a single tube, such as the RCA 6SN7-GT tube, and the limiting amplifier VT1 as shown may employ a single amplifying pentode, such as the RCA 6AC7 tube. The cathodes of the tubes VT1 to VT5 may be heated to incandescence from a single source (not shown) which may be a direct current battery. Space current is supplied from plate battery B1 to the plate of pentode amplifier VT1 through the resistors R1 and R2 in series; to the two plates of the alarm multivibrator VT2 through the series resistor R3 and the series resistor R4, respectively; to the two plates of the relay multivibrator VT3 through the resistor R5 and the winding of alarm relay S2 in series, and the series resistor R6, respectively; to the two plates of multivibrator VT4 through the series resistor R7 and the series resistor R8, respectively; and to the two plates of multivibrator VT5 through the series resistor R9, and the resistors R10 and R11 in series, respectively.

The control grid circuit for the amplifier tube VT1 is adapted for connection through input conductors 1, which may be a coaxial cable, and the jack and plug arrangement J1, across the output of the video amplifier VA in the radar receiver, and the input potentiometer P1 provides means for adjusting the level of the video wave energy applied to the input of the amplifier VT1 to a desired value. The condenser C1A is connected from a point between the plate resistors R1 and R2 to ground. The screen grid of amplifier VT1 is connected through series resistor R12 to the positive terminal of plate battery B1 and through condenser C1B to ground. The plate of amplifier VT1 is directly connected through series condenser C2 to the plate of the left-hand triode of alarm multivibrator VT2 and the latter plate is coupled through series condenser C3A to the control grid of the right-hand triode of the latter multivibrator.

The size of the coupling condenser C3A is determined by the pulse repetition rate of the associated radar system. As in some radar systems the pulse repetition rate is changed with a change in range scale, to adapt the alarm circuit of the invention for use with such systems, there is provided, as shown, a relay S1 which is adapted to be operated when switch K1 is actuated to close its energizing circuit from battery B2, the resultant operation of the relay causing one or more other condensers C3B of suitable size to be switched in parallel with condenser C3A to produce the desired capacity coupling for the changed pulse repetition rate.

The control grid circuit for the left-hand triode of the alarm multivibrator VT2 includes the lower resistance portion of the potentiometer P2, and the common cathode resistor R14 for the two triodes of that multivibrator, in series. The right-hand grid of multivibrator VT2 is connected through the series resistor R15 to the positive terminal of the plate battery B1. The plate circuit of the right-hand triode of multivibrator VT2 is connected through the band-pass filter integrator BPI including the resistors R16 to R18 and the resistance R19 of potentiometer P3, and condensers C4 to C7, to the control grid circuit of the relay multivibrator VT3.

The control grid circuit for the left-hand triode of the relay multivibrator VT3 includes the resistor R20, the adjustable lower resistor portion of potentiometer P3 and the common cathode resistor R21 for the two triodes of that multivibrator in series. The left-hand plate of the relay multivibrator VT3 is connected through the winding of alarm relay S2 and the condenser C8 in series to the right-hand grid of that multivibrator. The grid of the right-hand triode of multivibrator VT3 is connected through the series resistor R22 directly to the cathodes of that multivibrator.

The energizing circuit for the alarm lamp AL from the 400 cycle alternating source S through transformer T1 is broken at the open left-hand contacts of alarm relay S2 when that relay is unoperated, and the energizing circuit from the alternating source S through transformer T1 for the audible alarm circuit AAC, when the latter is plugged into the circuit by the jack and plug arrangement J3, is broken at the open right-hand contacts of alarm relay S2 when that relay is unoperated.

The control grid of the left-hand (input) triode of blanking multivibrator VT4 is connected through series resistor R23 to the positive terminal of plate battery B1 and through the series resistor R24 to ground.

The control grid circuit of the input triode of multivibrator VT4, which includes the common cathode resistor R25 for the two triodes, and the resistor R24 in series, is adapted for connection through the series condenser C9, the input potentiometer P4, input conductors 2, which may comprise a coaxial cable, and the jack and plug arrangement J2 to the pulse generator PG of the radar transmitter, so that the multivibrator VT4 is triggered off each time the pulse generator sends out an outgoing pulse. The plate of the left-hand (input) triode of multivibrator VT4 is connected directly to the control grid of the right-hand (output) triode of that multivibrator through series condenser C10. The control grid of the output triode of multivibrator VT4 is connected through the series resistor R26 and the upper resistance portion of potentiometer P5 in series to the positive terminal of plate battery B1, and through resistor R26, the lower resistance portion of potentiometer P5 and the resistor R27 in series to ground.

The plate of the output triode of multivibrator VT4 is connected through series condenser C11 to the plate of the left-hand (input) triode of blanking multivibrator VT5, and the latter plate is directly connected through series condenser C12 to the control grid of the right-hand (output) triode of multivibrator VT5. The control grid circuit for the input triode of multivibrator VT5 includes the common cathode resistor R28 for the two triodes. The control grid of the output triode of multivibrator VT5 is connected through the resistor R29, and the upper resistance portion of potentiometer P6 in series to the positive terminal of plate battery B1, and through resistor R29, the lower resistance portion of potentiometer P6 and resistor R30 in series to ground. A mid-point between the series resistors R10 and R11 in the plate circuit for the output triode of multivibrator VT5 is connected through the resistor R31 in lead 3 and the upper resistance portion of potentiometer P2 to the control grid of the input triode of the alarm multivibrator VT2.

The operation of the alarm arrangement of the invention as shown in Fig. 1 will now be described.

It is assumed that the transmitter T of the radar system is turned on so that radio pulses of very short duration are being sent out at frequent intervals from the transmitting antenna TA, and that the jack and plug arrangements J1 and J2 are operated to respectively connect the output of the video amplifier VA to the input of amplifier VT1 through input conductors 1, and the input of VT4 to the pulse generator PG through input conductors 2. When these radio pulses impinge on an object in their path, they will be reflected back to the observation point and will be picked up along with any accompanying noise waves by the receiving antenna RA. The received signal echoes and noise will pass from the antenna RA through the radio receiver RR in which they will be amplified and detected, and the detected waves will be further amplified by the video amplifier VA. A portion of the waves in the output of the video amplifier VA will pass to the signal deflecting plates of the cathode ray oscilloscope CRO causing its operation to display indications representing the detected signal echoes in the order of their receipt along a time axis on the oscilloscope screen.

Another portion of the waves in the output of the video amplifier VA, including both echoes and noise waves, will be applied through the jack and plug arrangement J1 and conductors 1 to the input of the limiting amplifier VT1 at a level of one or more peak volts. The applied waves will be amplified by amplifier VT1 and will be applied as negative pulses to the plate of the left-hand triode of the alarm multivibrator VT2 and thus to the grid of the right-hand triode through the condenser C3A connected between these electrodes. The control grids of the alarm multivibrator VT2 are normally biased so that the left-hand triode is non-conducting and the right-hand triode conducting. With the right-hand triode conducting, the voltage drop produced in the common cathode resistor 5 for the two triodes which is connected in series with the control grid circuit of the left-hand triode, by the flow of plate current through that resistor is effective to negatively bias the left-hand grid so as to maintain the left-hand triode non-conducting. The negative video pulse applied to the right-hand grid of tube VT2 biases the right-hand triode to cut-off and the resultant cessation in the flow of plate current through resistor 5 causes the negative bias on the left-hand grid to be reduced. The resultant bias is such that the left-hand triode can be "fired" only during the time that a positive enabling pulse is applied to its left-hand grid. This positive enabling pulse is produced by the "blanking" multivibrators VT4 and VT5 in combination in response to the "trigger" input applied to the input of the former multivibrator through input conductors 2 and jack and plug arrangement J2, from the pulse generator PG in the radar transmitter each time that generator sends out a pulse. Its purpose is to prevent operation of the alarm multivibrator VT2 and thus the actuation of the alarm lamp AL and the audible alarm circuit AAC through relay multivibrator VT3 by "near-in" echoes from any object within a given distance range, say, two to seven miles, from the observation point, and by echoes from distant objects beyond a given distance range, say ten to one hundred miles, from the observation point.

Fig. 2 shows the received pulses (idealized) as they relate to each other at various points in the circuit.

Fig. 2(a) shows a little more than a cycle of the trigger pulse applied to the input of multivibrator VT4 from the transmitting pulse generator PG. Each trigger pulse fires the "start-stop" multivibrator VT4 which operates in well-known-manner to generate a square-shaped pulse, such as shown in Fig. 2(b), in the plate circuit of its output triode. The duration of this pulse may be varied by adjustment of potentiometer P5 say, from 15 to 60 microseconds.

The output of VT4 is differentiated by the condenser C11 and applied to the plate of the left-hand triode of multivibrator VT5 causing that multivibrator to "fire." The positive pulse thereby generated in the plate circuit of the output triode of the latter multivibrator, which is shown in Fig. 2(c), is applied over the lead 3 connected to a point between plate resistors R10 and R11 to the left-hand control grid of the alarm multivibrator VT2, and serves as the enabling pulse for that multivibrator. As previously stated, only during the time interval in which the positive pulses are applied to the control grid of the left-hand triode of alarm multivibrator VT2 can the left-hand triode of the latter be fired in response to the video signal pulses, such as shown in Fig. 2(d), applied to input of amplifier VT1 and after amplification therein applied as negative pulses to the plate of the input triode of VT2. That is, the multivibrator VT2 can be fired by the echo represented by t1 but not by the echo represented by t2 [Fig. 2(d)].

Hence, the length or duration of the positive pulses generated by the blanking multivibrators VT4 and VT5 in combination determines the searching range of the alarm device. The beginning and end of each positive enabling pulse applied by the blanking multivibrators VT4 and VT5 to the alarm multivibrator VT2 may be varied by adjustment of the potentiometers P5 and P6, respectively. In the alarm arrangement of Fig. 1 which was built and tested, the durations of the positive enabling pulse were made such that the searching range varied from about 100 to 1000 microseconds when the repetition time of the transmitted pulses was over 1000 microseconds, and up to about 90 per cent of the repetition time when the latter was less than 1000 microseconds.

To obtain the necessary discrimination between signal echoes and noise, in designing the alarm circuit of Fig. 1, use was made of a number of distinguishing characteristics of the signals as compared to noise. In the interest of simplicity of circuit and adaptability to several different types of radar systems, only four distinguishing characteristics were made use of: (1) amplitude of the received signal echoes; (2) repetition rate of the transmitted signal pulses; (3) envelope frequency of a received group of signal echoes as the radar antenna sweeps the target; and (4) amplitude of the received signal echo group.

The "start-stop" alarm multivibrator VT2 used requires an applied video pulse of a definite amplitude to "fire" it. By proper selection of its associated resistance and condenser circuit elements, its time constant was made such that it stayed locked up for about one-half of the cycle of pulse frequency. It served, therefore, to discriminate against all noise peaks below the critical amplitude value, and, once fired, to discriminate against all amplitude peaks about one-half the cycle of the signal pulse frequency.

The amplitude of the received noise peaks in the output of the radar video amplifier VA will be random, of course, and therefore the amplitude of a number of them, as amplified by amplifier VT1 in the alarm circuit, will exceed the amplitude of a low amplitude signal echo pulse, and hence will cause multivibrator VT2 to be fired. High amplitude noise peak recurrence is also random. The signal pulses sent out from the radar transmitter will result in a group of echo pulses being applied to the input of alarm multivibrator VT2 as the radar antenna sweeps the target. The envelope of this group forms the third characteristic of the signal distinguishing from the noise applied to the alarm.

Now assume that a strong signal echo is received from a target at such a distance range that it is applied to the input triode of alarm multivibrator VT2 at some time within the duration of the enabling pulse applied thereto from the output of blanking multivibrator VT5 as described above. The alarm multivibrator will then be fired at the signal repetition rate for as long as it takes the radar antenna to sweep the target. This will result in a group of pulses in the output of the left-hand triode of VT2 of the form illustrated in Fig. 2(e), as shown in Fig. 3(a) which is drawn to the scale of the antenna sweep cycle.

The group of pulses when passed by the bandpass filter integrator BPI will appear as shown roughly in Fig. 3(b). The envelope of this group of pulses impressed on the control grid of the left-hand (input) triode of the relay multivibrator VT3 will cause that multivibrator to be tripped which in turn will cause the alarm relay S2 in its output plate circuit to be operated by the resulting multivibrator output current.

The alarm multivibrator VT2 output in response to applied noise peaks alone, because they are random in comparison with a group of signal echoes, on the other hand, will not ordinarily be of sufficient amplitude to fire the relay multivibrator, and the chance of operation of the alarm relay S2 in response to the noise echoes is reduced still more due to the effect of the bandpass filter integrator BPI, which provides additional discrimination of the scanning rate, and of the relay multivibrator VT3, which operates as a sharp amplitude discriminator of the bandpass filter integrator output as well as a means for providing lock-up operation of the alarm relay S2. The output current of relay multivibrator VT3, when it is once tripped, will cause the relay S2 to stay operated during the entire length of the relay multivibrator pulse which by suitable selection of circuit constants is made about half the time required for a complete antenna scan, and also provides additional protection against noise operation of the alarm relay during this time interval.

The duration of each relay multivibrator pulse is sufficiently long to lock up the alarm relay S2, as indicated in Fig. 3(c).

When relay S2 operates, the closing of its left-hand and right-hand contacts respectively complete an energizing circuit for the alarm lamp, AL, and also for the audible alarm circuit AAC if the latter is plugged in by J3, from the 400 cycle alternating source S through transformer T1. Thus, a visual and audible alarm will be produced to notify the radar operator that the indication of an echo from an object with the desired distance range is appearing on the indicator screen.

Various modifications of the circuits illustrated and described which are within the spirit and scope of the inventions will occur to persons skilled in the art.

What is claimed is:

1. In combination with a pulse reflection type object locating system including a transmitter for sending out short signal pulses of wave energy at regular intervals, a receiver for picking up and detecting echoes of the transmitted pulses reflected from objects in their path, said receiver being subject to interfering noise waves, and indicating means synchronized from said transmitter and controlled by the detected echoes for measuring the time interval elapsing between the emission of each transmitted pulse and the receipt of its echoes as a measure of the distance to the objects causing the echoes; means for automatically indicating to the operator of said system when an echo is being received comprising a multivibrator, means for causing said multivibrator to be triggered off at given times between the regular intervals of signal pulse transmission by all wave energy in the output of said receiver of an amplitude level above a given threshold value, whether comprising detected echoes or noise peaks, to provide a pulse wave output, a band-pass filter for integrating the pulse wave output of said multivibrator so as to provide frequency discrimination between multivibrator operation by a group of echoes and by relatively random noise over the scanning range of said receiver, a second multivibrator operatively responsive only to the integrated wave output of said filter of an amplitude which would be produced in response to multivibrator operation at the signal frequency, and alarm means responsive to the output of said second multivibrator.

2. In combination with a pulse reflection type object locating system including a transmitter for radiating short pulses of alternating signal wave energy at regular intervals, a receiver for picking up and detecting echoes of the radiated pulses reflected from objects in their path, and indicating means synchronized from the pulse transmitter and controlled by the detected echoes for displaying indications representing the echoes in the order of their receipt along a time axis on a screen to indicate the time interval elapsing between the emission of each radiated pulse and the return of its echoes as a measure of the distances to the objects causing the echoes, means for automatically indicating to the operator of such a system when an indication representing an echo from an object within a given distance range from said receiver appears on said screen comprising a multivibrator, means controlled by wave energy in the output of said receiver of amplitude level above a given threshold value, whether due to detected echoes or noise peaks, for causing operation of said multivibrator to produce an output wave, an alarm device, frequency-amplitude discriminating means controlled from the output of said multivibrator, for causing said alarm device to be actuated in response to the multivibrator operation by a group of echoes but to be unresponsive to multivibrator operation by noise peaks alone, and other means controlled from said transmitter for controlling the sensitivity of the first multivibrator so that it can be operated only by echoes received from objects within said given distance range.

3. The system of claim 2, in which said frequency-amplitude discriminating means comprises a band-pass filter for integrating the output wave of said first multivibrator, a second multivibrator controlled by the integrated wave and operatively responsive thereto when its amplitude level is above a given value such as would be produced by operation of said first multivibrator at the signal frequency by a group of received signal echoes, to actuate said alarm device.

4. The system of claim 2, in which said other means comprises two other multivibrators in tandem, means for causing said other multivibrators to be triggered off each time said transmitter sends out a pulse, to produce an output pulse of a given amplitude and a given duration, means to apply that output pulse as a positive bias to said first multivibrator to enable the latter during its duration only for operation by the wave output energy of said receiver above said given threshold value, and means associated with said tandem multivibrators for adjusting the time of beginning and ending of the enabling pulse so as to allow operation of said first multivibrator only by applied echoes from objects within said given distance range.

RAYMOND O. WISE.

REFERENCES CITED

The following references are of record in the file of this patent:

FOREIGN PATENTS

| Number | Country | Date |
|--------|---------|------|
| 113,233 | Australia | June 2, 1941 |